J. E. JOHNSTON.
HORSE STOCK.
APPLICATION FILED NOV. 25, 1916.
1,235,483.
Patented July 31, 1917.
3 SHEETS—SHEET 2.
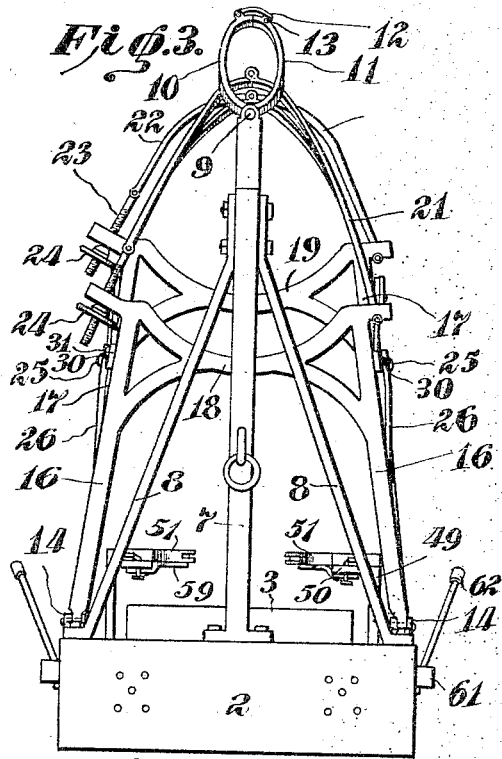
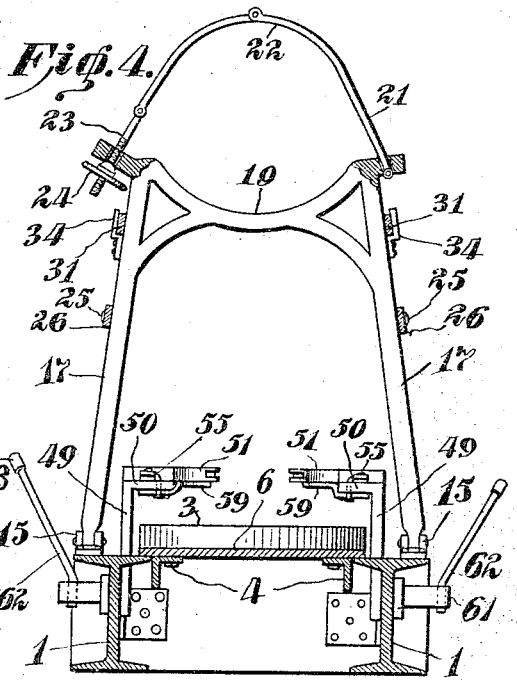
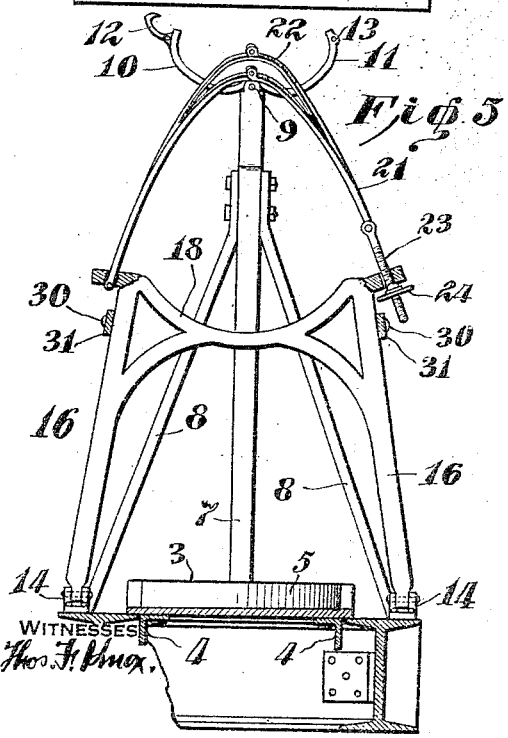
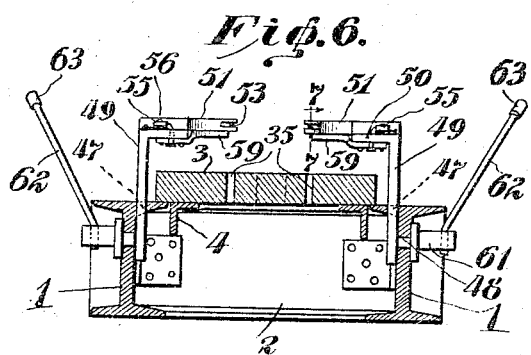
INVENTOR
John E. Johnston
BY Victor J. Evans
ATTORNEY

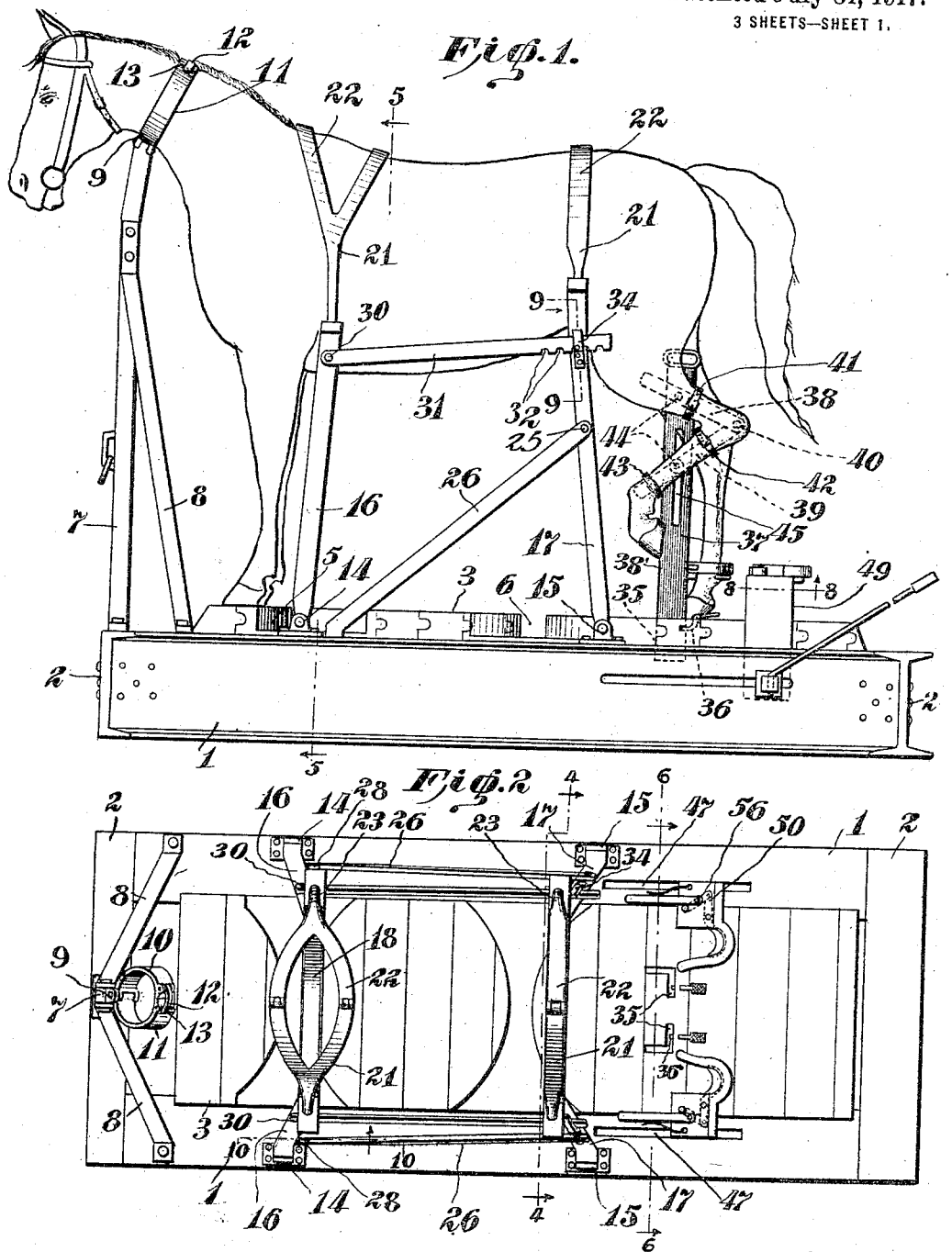

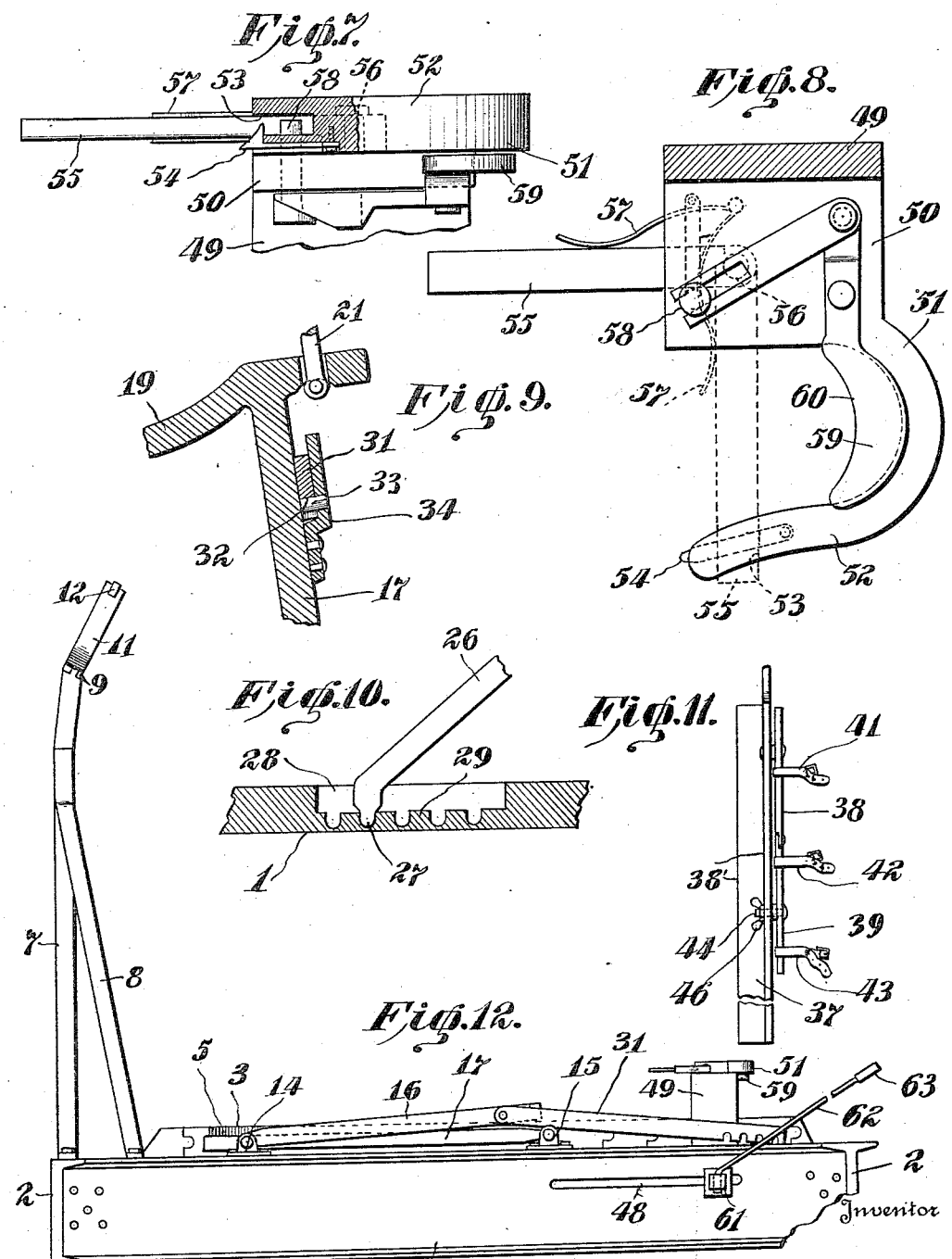

UNITED STATES PATENT OFFICE.

JOHN E. JOHNSTON, OF NEW YORK, N. Y.

HORSE-STOCK.

1,235,483.

Specification of Letters Patent.

Patented July 31, 1917.

Application filed November 25, 1916. Serial No. 133,454.

*To all whom it may concern:*

Be it known that I, JOHN E. JOHNSTON, a citizen of the United States, residing at New York, in the county of New York and State of New York, have invented new and useful Improvements in Horse-Stocks, of which the following is a specification.

The present invention relates to apparatus for securely holding young, wild, nervous and fractious horses against danger of the animal inflicting injury to the farrier while being shod.

The primary object of the invention is to produce apparatus for this purpose, which shall be in the nature of a stock and whereby the animal when once arranged thereon is so engaged as to be prevented from movement in any direction, but at the same time will be prevented from inflicting injury to himself or to the farrier.

It is a still further object of the invention to produce a stock for this purpose wherein the harness or holding means may be easily and quickly arranged upon the animal, without frightening the animal and without danger of the animal inflicting injury to the person securing the animal to the stock.

It is a still further object of the invention to produce a stock for horses which shall be of a simple construction, cheap to manufacture, easy to operate and which will perform the functions for which it is devised with efficiency and with accuracy.

With the above and other objects in view the improvement resides in the construction, combination and arrangement of parts set forth in the following specification and falling within the scope of the appended claims.

In the drawings:

Figure 1 is a side elevation of a horse stock constructed in accordance with the present invention and illustrating the manner in which the animal is positioned and retained thereon, Fig. 2 is a top plan view of the same, the animal being removed, Fig. 3 is a front elevation of the same, Fig. 4 is a sectional view approximately on the line 4—4 of Fig. 2, Fig. 5 is a sectional view approximately on the line 5—5 of Fig. 1, the animal being removed, Fig. 6 is a sectional view approximately on the line 6—6 of Fig. 2, Fig. 7 is a sectional view approximately on the line 7—7 of Fig. 6, Fig. 8 is a sectional view approximately on the line 8—8 of Fig. 1, Fig. 9 is a sectional view approximately on the line 9—9 of Fig. 1, Fig. 10 is a detail vertical longitudinal sectional view through one of the slots in one of the side members of the device illustrating the manner in which the toothed end of one of the brace members for the rear uprights adjustably engage between the teeth formed in the lower wall of the slot.

Fig. 11 is an elevation of one of the leg jacks, and

Fig. 12 is a side elevation of the improvement illustrating the arrangement of parts when the body engaging elements of the stock are folded upon the base.

The side members 1 of the base of my improvement are preferably constructed as illustrated by the drawings of I-beams of a sufficient size and strength, while connecting the beams 1 are angle beams 2. By this arrangement it will be noted that a space is left at the top and bottom in the center of the base, and straddling this space is the floor for the base which is indicated by the numeral 3. The floor is constructed preferably of tongue and groove material and the same is secured to longitudinally extending L-irons 4, the said irons 4 being sufficiently spaced to be snugly received between the inner flanges of the top members of the I-beams 1 and the angle irons 2. The bottom 3, at a suitable distance from what I will term the forward end thereof, at approximately the middle thereof, is formed with transverse slots or depressions 5 and 6 respectively, the purpose of which arrangement will be presently set forth.

Secured to the front of the base and arising therefrom is a standard 7, the same having its sides provided with brace members 8 which are connected to the base. The standard 7 at the upper portion thereof has pivotally secured thereto, as at 9, a pair of oppositely disposed arcuate metallic straps 10 and 11 respectively. The strap 10 having its free end provided with a pivoted catch 12 which is adapted to engage in a suitable keeper 13 in the free end of the strap 11. The members 10 and 11 provide what I will term a collar and are adapted to be arranged over the neck of the animal when the latter is led upon the bottom of the platform 3, and when the catch 12 is applied it will be noted that the head of the animal will be effectively secured.

Pivotally secured between spaced ears 14 and 15 to the beams 1, to the opposite sides of the platform 3 are the upright members 16—16 and 17—17 of the front and rear body engaging members 18 and 19 respectively of the device. The connecting members between the respective pairs of uprights 16 and 17 are bowed so that the same may snugly accommodate themselves to the body of the animal and the said arched or bowed members 18 and 19 at one of their ends are each provided with a hinged or pivoted element 21 of a strap 22, each of said straps comprising a plurality of hingedly connected members, and the end member opposite the member 21 has loosely connected therewith a bolt 23 which is adapted to pass through a suitable opening in the respective members 18 and 19 at points diametrically opposite the hinged connection of the straps thereto, and the said bolts are engaged by nuts 24. The nuts 24 are preferably provided with rounded peripheries, the same being milled, and the strap 22 of the member 16 is adapted to be arranged over the shoulder of the animal, while the strap 22 is adapted to be arranged over the back of the animal at the rear thereof. The straps 22 thereof, it will be noted, are adjustable and by hinging the same as above described the said straps may be readily swung over the back of the animal. The members 18 and 19 as previously described have their uprights 16 and 17 pivotally secured between the ears 14 and 15 and the same are so disposed that the connecting portions thereof will be received in the respective depressions 5 and 6 on the platform 3 when the same are swung to a level with the platform and the upright members 16 of the front member 18 are disposed inwardly of the uprights 17 of the member 19, to escape the same when the body members 18 and 19 are brought to a level with the platform, and by this arrangement it will be noted that no obstruction is offered to the animal when he is led upon the platform and also when the said animal is positioned upon the platform and secured by the collar, as previously described, the body members may be swung and the uprights thereof will be disposed inwardly of the front and rear legs of the animal.

As the device is adapted for use upon various sizes of animals and also as it is desirable to brace the members 18 and 19, I pivotally secure, as at 25, to each of the members 17, an angularly disposed rod 26, the same having its outer or free end formed with a tooth 27, and the said tooth is adapted to play within a longitudinal slot 28 in each of the flanges of the members 1 and to engage with one of a plurality of teeth 29 at the base of the said slot. By this arrangement it will be noted that the member 17 may be retained at any desired angle with relation to the platform 3 and also with relation to the animal with which it engages. In order to support the front body-engaging member 17 against swinging movement, I pivot to the vertical members 16 of the same, as at 30, longitudinally extending rods 31, the said rods being notched, as at 32, and one of the notches engaging with the tooth 33 provided in a bracket member 34 upon each of the uprights 17.

The platform 3 to the rear of the member 19 is centrally provided with a plurality of sockets 35 which are substantially L-shaped in plan and which have arranged therein each a spring catch 36.

The numeral 37 designates the leg jack which is adapted to have one of its ends received in one of the said sockets 35 after the animal has been placed upon the platform. The jack 37 has its body portion in the nature of a channeled member, so that the same is snugly received in the slot 35, and the end of the jack which enters the said slot is adapted to be snugly engaged by the spring catch 36 whereby to effectively sustain the jack in an upright position with relation to the device, but at the same time permitting of the ready removal of the jack when desired. The sides 38' of the angle member or body of the jack 37 have pivotally secured thereto, adjacent the top and bottom of the said jack, link members 38 and 39 respectively, the said links having their confronting ends reduced and being pivotally connected, as indicated by the numeral 40. Upon the link member 38 is arranged a strap 41 provided with a suitable buckle and upon the link member 39 is arranged two straps 42 and 43 respectively, each of said straps being also provided with suitable buckles. Each of the link members 39 is further provided with a bolt member 44 that passes through an elongated slot 45 in the side or flange 38' of the jack, the inner and threaded ends of the bolts being engaged by turnbuttons 46—46. When the animal has been arranged upon the platform of the stock and engaged as previously described the strap 41 upon one side of the jack is adapted to be passed around the thigh of the hind leg of the animal and fastened thereto. The strap 42 is secured to the shank of the leg below the hock and the strap 43 is arranged upon the shank of the leg above the hoof. When this is accomplished the link 39 is moved upwardly of the jack, the said link being guided by the bolt 44 passing through the slot 45 and when the proper adjustment has been made to bend the leg of the animal so that the farrier can freely operate upon the hoof thereof, the member 46 is screwed upon the bolt holding the links as stated and the leg of the animal at a desired angle.

After the shoe has been applied to one of the hoofs the straps of the links upon the opposite side of the jack are connected and the said links operated as above described and held by the said member 46 so that the shoe can thus be readily applied to the hoof of the animal.

Before, however, the shoes are nailed to the foot of the animal, it is highly desirable and in most instances essential to the safety of the farrier that the hind legs of the animal be securely held before the leg jacks are applied and I accomplish this in the following manner: The members 1 for the base, adjacent to the rear thereof have their upper members or flanges provided with elongated slots 47 and their webs provided with similar slots 48 disposed parallel to the slots 47. Passing through each of the slots 47 is a plate 49 that has its upper edge flanged inwardly, as at 50, and to the flange 50 of each of said members is formed or otherwise secured a hook-shaped element 51, the said element projecting inwardly of the flange 50. The outer arm 52 of each of the members 51 is disposed adjacent to the side walls of the respective sockets 35, and, of course, adjacent to the side flanges of the member 37 when the said member is arranged in one of the sockets. The said outer portions 52 of the members 51 have their ends flared toward each other and are preferably notched, as at 53, and within one of the walls of the said notches may be, and preferably is, arranged a catch 54. The numeral 55 designates the gate for each of the substantially U or hook-shaped members 51, one of each of the gates 55 being pivotally secured, as at 56, to the angle members 50 of the members 49. The gate members are normally influenced by springs 57 so that the same may be swung to bridge the opening in the hook-shaped members 51 and to be received in the notches or depressions 53 thereof and to be engaged and locked upon the said members by the catches 54. In order, however, to normally sustain the members 51 in their open condition to receive the hoof of the animal, I provide spring pressed pins 58 which pass through suitable openings in the members 49 and are disposed to contact with the gates 55 to hold the same in their open positions. The spring pressed pins 58 are influenced by trigger members 59, one being provided for each of the hoof-engaging elements 51, and each of the said members 59 is provided with a rounded contact portion 60 disposed within each of the members 51 but arranged inwardly with respect to the outer rounded wall of the said members, and by this arrangement it will be noted that when the portions 60 of the triggers 59 are contacted the same will influence the springs 58 to actuate the pin or stop members 59 and permit the springs 57 to influence the gate members and swing the same to closing position.

Upon each of the members 49 is arranged an offset portion or lug 61 which passes one through each of the referred to slots 48, and upon each of these lugs 61 is loosely secured a rod 62 which preferably has its outer end formed with a handle 63, and by this arrangement it will be noted that the hoof engaging members 51 may be moved longitudinally of the device so that the said members may receive the hoofs of the animal and the contact of the said hoofs with the portions 60 of the triggers 59 will actuate the said triggers in a manner, and for the purpose described. It will be noted that either of the gages may be readily brought to its unlocking position, so that each of the rear legs of the animal may be successfully released after the same has been engaged by the straps connected to the links of the jack 37 in a manner as previously described.

While from practice it has been found that with a structure as above described access can be obtained to the fore-legs of the animal so that the shoes can be applied to the hoofs thereof, it is to be understood that I may, if I find it desirable, arrange hoof clamps for the said forelegs and also a leg jack similar to that previously described.

Having thus described the invention, what I claim is:

1. In a device for the purpose set forth, a platform, a brace standard arising from the front thereof, arched members pivotally secured to the standard, a latch for connecting the arched members, body-engaging members pivotally secured to the base, means for retaining the members in their set up condition, substantially U-shaped hoof-engaging members upon the base, a gate for each of said members, means for normally retaining the gate in a line with one of the arms of the said U-shaped members, and means arranged in each of said U-shaped members disposed to actuate the gate for swinging the gate across the said U-shaped members.

2. In a horse shoeing stock, a base, a standard arising from the base at the front thereof, a collar member connected with the standard, horse body engaging members pivotally secured to the base, adjustable straps associated with said members, hoof-engaging members adjustably associated with the base, each of said members including a substantially U-shaped element, and a pivoted gate for closing the gap between the side arms of the element, catch members for sustaining the gates in such position, spring means for retaining the gates unlatched and in a line with one of the arms of the U-shaped members, and a trigger member disposed in each of the U-shaped members and adapted to actuation for releasing the gates to permit of the closing thereof.

3. In a horse shoeing stock, a base, a platform secured upon the base, a standard upon the front of the base, a horse neck-engaging member upon the standard, horse body-engaging members each including standards which are pivotally secured to the base, and arch-shaped members connecting the standards and which are disposed to engage between the fore and hind legs of the animal, strap members connected with the arch-shaped members and adapted to be arranged over the back of the animal, means for retaining the body engaging members in their set up position, hoof engaging elements upon the base, means for longitudinally adjusting said elements, and a leg jack upon the base disposed between the hoof engaging elements.

4. In a horse shoeing stock, a base, means upon the base for engaging with the neck of a horse, swinging means upon the base adapted to be moved beneath the body of the horse and to be disposed inwardly of the front and rear legs of the horse, means for adjustably sustaining the said members in such swung position, brace members for the said members, straps for the members disposed to receive the body of the horse, hoof engaging members for the rear legs of the horse and arranged for longitudinal movement upon the base, locking gates for the hoof-engaging members, latching means for the said gates, a leg jack removably associated with the base, said jack including pivoted links, having their meeting ends reduced and pivotally connected, straps upon the links, and means upon one of the links and co-acting with the jack for permitting the longitudinal movement of the said links with relation to the jack and the locking of the said link upon the jack.

5. In a horse shoeing stock, a base, a platform on the base, a standard upon the base at one end thereof, a pivoted collar secured to the standard, a catch for the collar, means comprising members disposed to engage with the body of the horse between the front and rear legs thereof and pivotally secured to the base, and said members adapted to be swung upon the base when in their inactive position, means pivotally secured to one of the members for adjustably securing the same angularly of the base, means upon the other member engaging with the first mentioned member for adjustably retaining the other mentioned member with relation to the first mentioned member, adjustable straps upon both of the members and adapted to encircle the body of the horse, hoof-engaging means longitudinally adjustable upon the base, gate members for the hoof-engaging means, means adapted to be actuated when the hoof-engaging members are brought to hoof-engaging position to release the gates to permit the same closing against the hoof of the animal, a leg jack connected with the base, a link pivotally secured to the sides of the jack, a second link pivotally secured to the first mentioned link, a bolt member upon the first mentioned link, slots upon the jack through which the bolt member passes, winged nuts for the bolt members, and straps upon the links.

In testimony whereof I affix my signature.

JOHN E. JOHNSTON.

Copies of this patent may be obtained for five cents each, by addressing the "Commissioner of Patents, Washington, D. C."